Patented May 24, 1932

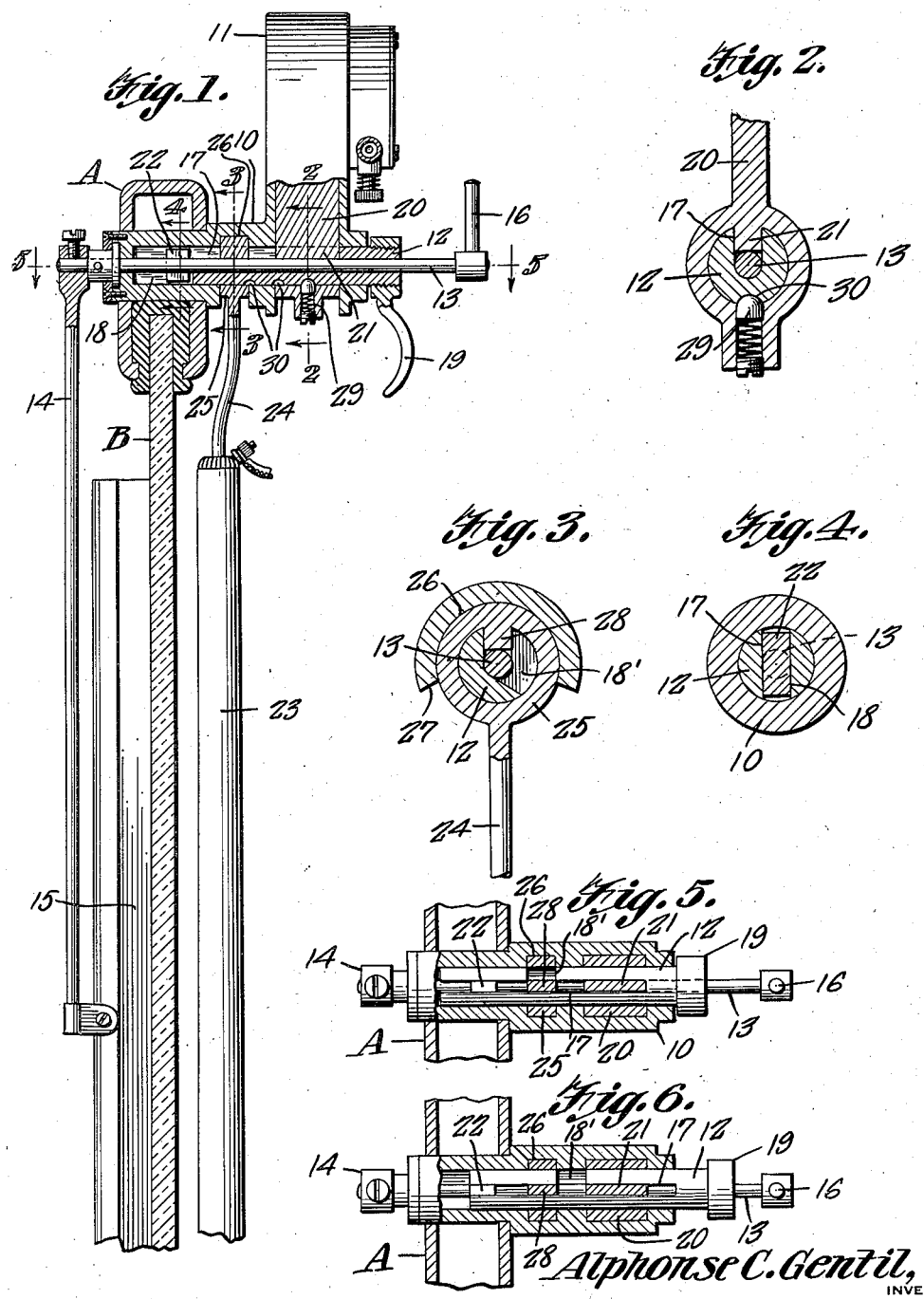

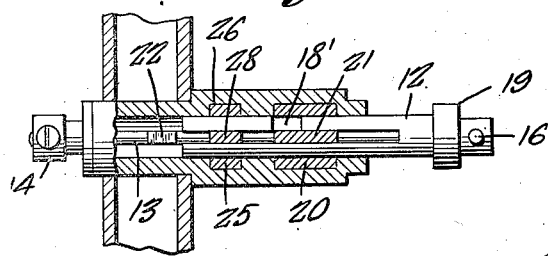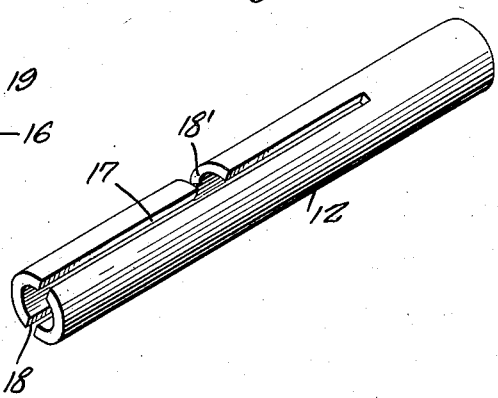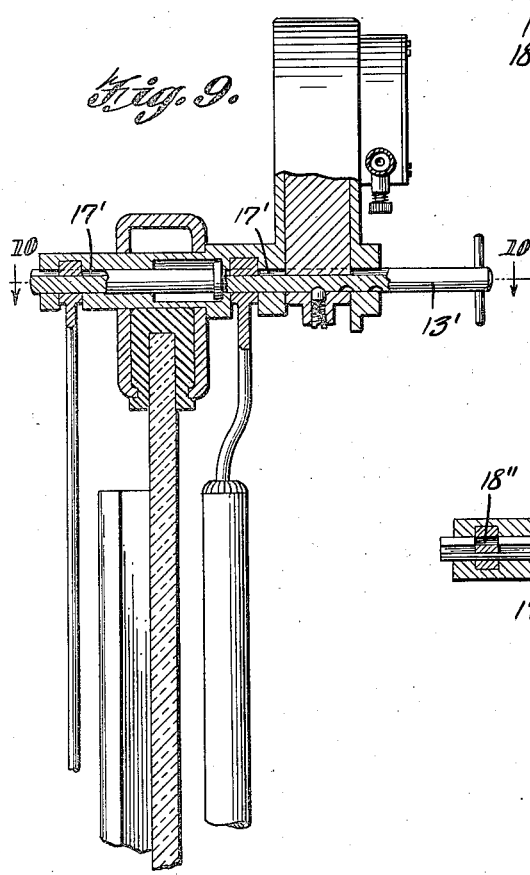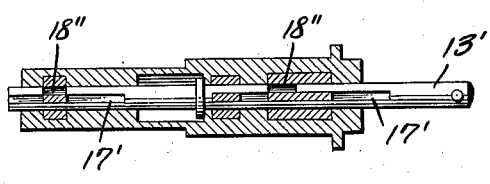

1,860,281

UNITED STATES PATENT OFFICE

ALPHONSE C. GENTIL, OF RICHMOND, VIRGINIA

COMBINED WINDSHIELD WIPER AND HEATER

Application filed May 23, 1930. Serial No. 455,055.

This invention relates to a combined windshield wiper and heater, the general object of the invention being to support the wiper at the front of the windshield and the heater in rear thereof, the two members being in alignment with each other, with means for operating both members simultaneously or either member alone.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a vertical sectional view through the windshield and through the operating means of the device.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 1.

Figure 6 is a view similar to Figure 5, but showing the parts in a different position.

Figure 7 is a view similar to Figure 5, but showing the parts in still another position.

Figure 8 is a view of the slotted tubular member.

Figure 9 is a view similar to Figure 1, but showing a modification.

Figure 10 is a section on line 10—10 of Figure 9.

In these views, the numeral 10 indicates a tubular supporting member having its front end passing through the top part of the frame A of the windshield B and the lower part of the housing 11 for the motor of the wiper is connected with the rear part of this member. A tubular member 12 is supported for sliding movement in the member 10 and a shaft 13 passes through the member 12 and the arm 14 which carries the wiper element 15 is fastened to the front end of this shaft. The usual handle 16 is fastened to the rear end of the shaft. This shaft is slidably arranged in the member 12. The member 12 is formed with the diagonally arranged slots 17 and 18, each slot extending through the front end of the member and the lower slot 18 is of much less length than the upper slot. A notch 18′ is formed in the member 12, intermediate its ends, and opens into the slot 17. A handle 19 is removably fastened to the rear end of the member 12 so that it can be moved longitudinally in the member 10.

The operating part 20 of the motor has a projection 21 at its lower end which fits in the rear part of the slot 17 so that the rocking movement of this member 20 is imparted to the member 12 and the front portion of the shaft 13 carries a plate-like projection 22 which is adapted to engage the front ends of the slots 17 and 18 when the member 12 is pushed forwardly, as shown in Figures 1 and 5, so that the rocking movement of the member 12, under the influence of the member 20, will be imparted to the shaft and thus the wiper element will be oscillated over the transparent member B. However, when the member 12 is moved outwardly to the position it occupies in Figure 7, the projection 22 will be out of engagement with the slots 17 and 18 so that the shaft will not be rocked by the movement of the member 12 and therefore the wiper element will not be oscillated.

A heater element 23 has an arm 24 connected with its upper end and this arm is formed with a ring 25 at its top which is seated in an annular recess 26 formed in the interior of the supporting member 10 and the lower part of the recessed portion is cut away, as at 27, so as to permit the arm 24 to oscillate. The ring 25 surrounds the tubular member 12 and has a projection 28 thereon which fits in the slot 17 of the member 12. Thus the arm 24 and the heating element 23 will be oscillated when the projection 28 is located in the slot 17, but when the member 12 is in its forward position, the notch 18′ will be in alignment with the projection 28, as shown in Figures 1, 3 and 5, so that the member 12 will oscillate without moving the arm 24. Thus the heating element will not be moved when the parts are in this position, though the wiper element will not be oscillated. By moving the member 12 outwardly a certain distance, the projection 28 will be moved out of alignment with the notch 18', as shown in Figure 6, so that in this position, the heating element will move with the wiper element. When the member 12 is moved rearwardly to its full extent, the projection 28 will still engage the slot 17, but the projection 22 will be out of engagement with the member 12, as shown in Figure 7, so that in this case the wiper element will remain idle while the heater element oscillates. A detent 29, carried by the supporting member 10, is adapted to engage any one of three recesses 30 in the member 12 to hold the said member 12 in either one of its three positions.

From the foregoing it will be seen that I have provided means whereby the heating element can be made to move with the wiper element or either the heating element or the wiper element can be made to move alone. This is done by moving the member 12 longitudinally through means of its handle 19. The parts are so arranged that the heating element parallels the member 15 when the two members are moving together.

In the modification shown in Figures 9 and 10, the tubular member 12 is omitted and the shaft 13' is formed with the grooves 17' and the recesses 18'' for receiving the projections. Thus in one position of the shaft 13', both the wiper element and heater element will move in unison, in another position, the wiper will be moved alone and in a third position, the wiper will remain idle as the heater element oscillates. In other respects, this form of the invention is similar to that before described.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A combined windshield wiper and heater comprising a hollow supporting member, a heater arm journalled in said member, a heater secured to the arm, a slidable sleeve journalled in said member and having oppositely disposed slots opening outwardly of one end thereof, a shaft journalled in the sleeve, a wiper secured to said shaft, means for oscillating the sleeve, means whereby said sleeve may be moved endwise to occupy several positions, means to hold the sleeve in any of its positions, projections on the shaft to fit in said slots during one position of the sleeve to cause oscillation of the wiper, said sleeve having a notch communicating with one of the slots, and a lug on the heater arm to engage in said slot during one of the positions of the sleeve to oscillate the heater and to operate in said notch when said sleeve occupies one of its other positions.

In testimony whereof I affix my signature.

ALPHONSE C. GENTIL.